US012553487B2

(12) United States Patent
Kuckert et al.

(10) Patent No.: US 12,553,487 B2
(45) Date of Patent: Feb. 17, 2026

(54) BRAKE DISC AND METHOD FOR MANUFACTURING A BRAKE DISC

(71) Applicants: Robert Bosch GmbH, Stuttgart (DE); Breyden GmbH, Breidenbach (DE)

(72) Inventors: Hagen Kuckert, Bietigheim-Bissingen (DE); Ilja Potapenko, Biedenkopf (DE); Thomas Pfeiffer, Steffenberg (DE); Kangjian Wu, Marburg (DE)

(73) Assignees: Robert Bosch GmbH, Stuttgart (DE); Breyden GmbH, Breidenbach (DE)

( * ) Notice: Subject to any disclaimer, the term of this patent is extended or adjusted under 35 U.S.C. 154(b) by 530 days.

(21) Appl. No.: 16/627,558

(22) PCT Filed: Jul. 12, 2018

(86) PCT No.: PCT/EP2018/068912
§ 371 (c)(1),
(2) Date: Dec. 30, 2019

(87) PCT Pub. No.: WO2019/020390
PCT Pub. Date: Jan. 31, 2019

(65) Prior Publication Data
US 2020/0217382 A1  Jul. 9, 2020

(30) Foreign Application Priority Data

Jul. 25, 2017  (DE) ............. 10 2017 212 706.6

(51) Int. Cl.
*F16D 69/02* (2006.01)
*C22C 29/08* (2006.01)
(Continued)

(52) U.S. Cl.
CPC ............ *F16D 69/027* (2013.01); *C22C 29/08* (2013.01); *C23C 4/02* (2013.01); *C23C 4/06* (2013.01);
(Continued)

(58) Field of Classification Search
CPC .. C23C 4/02; C23C 4/06; C23C 24/04; F16D 65/125–128
(Continued)

(56) References Cited

U.S. PATENT DOCUMENTS 4,715,486 A * 12/1987 Burgdorf ............... F16D 69/02
188/251 A
5,612,110 A * 3/1997 Watremez ............ F16D 69/027
428/614
(Continued)

FOREIGN PATENT DOCUMENTS

AU  547217 B2  10/1985
CN  1219496 A  6/1999
(Continued)

OTHER PUBLICATIONS

Yan Yu-Tao et al., "Friction and Wear Behaviors of WC Coatings at High Temperature," Journal of Northeastern University (Natural Science), vol. 35, No. 6, pp. 858-862, Jun. 2014 (5 pages).
(Continued)

*Primary Examiner* — Christopher P Schwartz
(74) *Attorney, Agent, or Firm* — Maginot, Moore & Beck

(57) ABSTRACT

A brake disc includes at least one friction surface consisting of a base body. The base body can be made from gray cast iron. At least one coating is applied on at least parts of the friction surface. The coating contains at least tungsten chromium carbide 2C and nickel-chromium NiCr. The coating may further contain tungsten carbide WC. The production of the brake disc according to the disclosure is also described herein. The coating has excellent oxidation resistance and good wear resistance even at high temperatures of up to 800° C.

20 Claims, 3 Drawing Sheets

(51) Int. Cl.
*C23C 4/02* (2006.01)
*C23C 4/06* (2016.01)
*F16D 65/12* (2006.01)
*F16D 65/02* (2006.01)

(52) U.S. Cl.
CPC ......... *F16D 65/125* (2013.01); *F16D 65/127* (2013.01); *F16D 2065/132* (2013.01); *F16D 2200/0013* (2013.01); *F16D 2200/0039* (2013.01); *F16D 2200/0078* (2013.01); *F16D 2250/0046* (2013.01)

(58) Field of Classification Search
USPC .................................................. 188/218 XL
See application file for complete search history.

(56) References Cited

U.S. PATENT DOCUMENTS

| | | | |
|---|---|---|---|
| 5,964,322 | A | 10/1999 | Thompson et al. |
| 8,877,296 | B2 * | 11/2014 | Lembach .............. F16D 65/127 |
| | | | 427/451 |
| 2002/0131328 | A1 * | 9/2002 | Bowens ................ B29C 48/509 |
| | | | 366/318 |
| 2011/0278116 | A1 * | 11/2011 | Lembach ................ F16D 69/02 |
| | | | 188/218 XL |
| 2013/0161136 | A1 * | 6/2013 | Huschenhoefer ......... C23C 4/00 |
| | | | 188/218 XL |
| 2017/0122392 | A1 * | 5/2017 | Lembach ................ F16D 69/04 |
| 2017/0130060 | A1 * | 5/2017 | Krishnan ............. C10M 125/26 |
| 2019/0056003 | A1 * | 2/2019 | Carminati ............... C23C 24/04 |

FOREIGN PATENT DOCUMENTS

| | | |
|---|---|---|
| CN | 1309106 A | 8/2001 |
| CN | 102839313 A | 12/2012 |
| CN | 103108714 A | 5/2013 |
| CN | 103185087 A | 7/2013 |
| CN | 103185088 A | 7/2013 |
| CN | 106219547 A | 12/2016 |
| CN | 106415048 A | 2/2017 |
| DE | 10 2011 087 136 A1 | 5/2013 |
| JP | 2642243 B2 | 8/1997 |
| JP | 2001-234320 A | 8/2001 |
| JP | 2003-35090 A | 2/2003 |
| JP | 2007-10056 A | 1/2007 |
| JP | 2008144281 | 6/2008 |
| JP | 2011-31247 A | 2/2011 |
| JP | 2013-529136 A | 7/2013 |
| JP | 2015-505940 A | 2/2015 |
| KR | 2014-0104417 A | 8/2014 |
| WO | WO-2010089047 A1 * | 8/2010 ............. F16D 69/02 |

OTHER PUBLICATIONS

International Search Report corresponding to PCT Application No. PCT/EP2018/068912, mailed Sep. 27, 2018 (German and English language document) (5 pages).
Shi, Jin et al., Effect of WC Based Coating Materials and Fabrication Technology on the Structures and Properties, Thermal Spray Technology, Jun. 2015, vol. 7, No. 2, pp. 39-45, China (7 pages).
Ji, M., "Advanced Refractory Composite Coatings," Oct. 1984, pp. 143-146 (Chinese language document) (7 pages).
English Translation of Ji, M., "Advanced Refractory Composite Coatings," Oct. 1984, pp. 143-146 (3 pages).
Bolelli, G. et al., "Comparative study of the dry sliding wear behaviour of HVOF-sprayed WC—(W,Cr)2C—Ni and WC—CoCr hardmetal coatings," Nov. 2013, Wear, vol. 309 (2014), pp. 96-111, Elsevier (16 pages).
Hou, G. L. et al., "Effect of heat treatment on wear behaviour of WC—(W,Cr)2C—Ni coating," 2012, Surface Engineering, vol. 28, No. 10, pp. 786-790, Institute of Materials, Minerals and Mining, published on behalf of the Institute of Metals and the Wolfson Institute for Surface Engineering (5 pages).
Hou, G. L. et al., "Microstructure and high-temperature friction and wear behavior of WC—(W, Cr)2C—Ni coating prepared by high velocity oxy-fuel spraying," Jul. 2011, Surface and Coatings Technology, vol. 206 (2012), pp. 82-94, Elsevier (13 pages).
China State Intellectual Property Office, Reexamination Notice for counterpart Chinese patent application No. 201880049756A, Jul. 1, 2025, Chinese language, English language translation provided (14 pages).
China Machine Press, Handbook of Functional Materials and their Applications, pp. 477-478, 1st Edition, 1st Printing, Jul. 1991, Chinese language, partial English language translation provided (8 pages).
Meijie Zhang et al., Industrial Kilns for Inorganic Non-Metallic Materials, pp. 140-141, 1st Edition, 1st Printing, Apr. 2008, Chinese language, partial English language translation provided (5 pages).
Chengjin Shen et al., Materials Heat Treatment and Surface Engineering, China University of Mining and Technology Press, Chinese language, English language translation provided (8 pages).
Bolelli Giovanni et al., Comparative Study of the Dry Sliding Wear Behavior of HVOF-sprayed WC—(W, CR)2C—Ni/Ag and WC-CoCr Hardmetal Coatings, vol. 309, pp. 96-111, Jan. 2015 (7 pages).

* cited by examiner

BRAKE DISC AND METHOD FOR MANUFACTURING A BRAKE DISC

This application is a 35 U.S.C. § 371 National Stage Application of PCT/EP2018/068912, filed on Jul. 12, 2018, which claims the benefit of priority to Serial No. DE 10 2017 212 706.6, filed on Jul. 25, 2017 in Germany, the disclosures of which are incorporated herein by reference in their entirety.

The present disclosure relates to a brake disk and a process for producing a brake disk having the features described herein.

BACKGROUND

Brake disks have the task of transmitting the braking momentum to the axle on slowing of the vehicle and also temporarily storing the kinetic energy arising during braking for a short time in the form of heat and subsequently passing it on again by conduction, radiation and convection.

Conventional brake disks are frequently made of the heat-resistant gray cast iron. Wear-resistant brake disks are produced by either using very expensive solid ceramic brake disks or spraying a wear protection layer onto a gray cast iron (GCI) disk by means of thermal spraying processes, for example HVOF processes. WC-based powder is frequently used for this purpose and leads to high wear resistance. Such a brake disk is disclosed in DE 10 2011 087 136 A1.

As mentioned above, heat is generated on braking and is stored in the brake disk. The temperature increases in extreme cases, i.e. braking from full speed, up to 800° C. For this reason, the wear protection layers of the cast iron brake disks have to have sufficient wear resistance at high temperatures up to 800° C.

SUMMARY

The disclosure proceeds from a brake disk comprising at least one friction surface consisting of a main element. The main element can be made of gray cast iron. At least one coating is applied to at least parts of the friction surface.

The key idea of the disclosure is that the coating contains at least tungsten-chromium carbide (W, Cr)$_2$C and nickel-chromium NiCr.

In a particularly advantageous embodiment, the coating additionally contains tungsten carbide WC.

Tungsten-chromium carbide (W, Cr)$_2$C is tungsten dicarbide W$_2$C into which chromium has been incorporated in various amounts. This mixed carbide is therefore referred to as (W, Cr)$_2$C. This phase has excellent oxidation resistance and good wear resistance even at high temperatures up to 800° C. In addition, the high-temperature strength and high-temperature oxidation resistance of nickel are significantly increased by alloying with chromium.

In the coating, tungsten carbide WC is advantageously essentially uniformly dispersed in a matrix phase composed of tungsten-chromium carbide (W, Cr)$_2$C and nickel-chromium NiCr.

Above a braking temperature of about 600° C., a very thin and impermeable oxide layer which can contain, in particular, at least nickel-tungsten oxide NiWO$_4$ and/or chromium-tungsten oxide CrWO$_4$ and/or chromium oxide Cr$_2$O$_3$ and/or tungsten oxide WO$_3$ will advantageously be formed on the layer surface. The formation of the oxide layer considerably slows the further oxidation process of the wear protection layer, which very effectively avoids oxidation and a loss of function of the coating at high temperatures.

The coating according to the disclosure can be applied directly to the main element. Here, the coating is, in particular, applied to a worked or modified surface of the main element.

However, the coating according to the disclosure can also have been applied by means of at least one intermediate layer to the main element, with the intermediate layer being able to be a metallic intermediate layer which contains, for example, nickel Ni. However, the intermediate layer can also be realized by means of a treatment of the surface of the main element, for example by means of a remelting process.

The disclosure also provides the production of a brake disk comprising at least one friction surface consisting of a main element, in particular a main element made of gray cast iron, and at least one coating applied to at least parts of the friction surface.

The disclosure also includes the step of coating at least parts of the friction surface with at least tungsten-chromium carbide ((W, Cr)$_2$C) and nickel-chromium (NiCr).

Further advantageous embodiments of the disclosure are described below.

BRIEF DESCRIPTION OF THE DRAWINGS

Working examples of the disclosure will be illustrated below with the aid of drawings. The drawings show.

DETAILED DESCRIPTION

Figure 1:
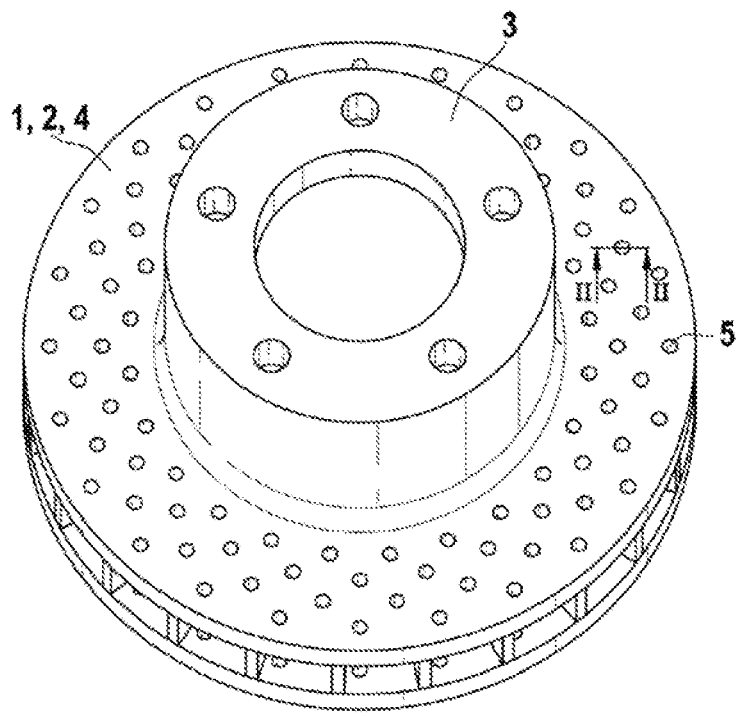
FIG. 1 shows a perforated and coated brake disk as per the prior art.

The brake disk 1 depicted in FIG. 1 comprises a circular disk-shaped brake ring 2 and a bowl-shaped hub 3 which is made in one piece with and is coaxial with the brake ring 2. The friction ring 2 forms the actual brake disk. The brake disk 1 is internally ventilated, and its brake ring 2 is double-walled. Outer end faces of the brake ring 2 form circular disk-shaped friction surfaces 4 of the brake disk 1. The friction surfaces 4 are the surfaces of the brake disk 1 against which friction brake linings (not shown) are pressed during braking in order to brake the brake disk 1 by friction. The brake disk 1 is perforated, i.e. it has holes 5 which run through the brake ring 2. The brake disk 1 consists of gray cast iron or a steel alloy.

The friction surfaces 4 of the brake disk 1 are provided with a surface coating which increases wear resistance and corrosion resistance. The surface coating can be a thermal powder coating which is applied, for example, by flame spraying or electric arc spraying. The surface coating of the friction surfaces 4 can comprise carbides, in particular metal carbides, for example chromium or tungsten carbides, which are embedded in a matrix, in particular a metallic matrix composed of, for example, nickel or cobalt. The surface coating of the friction surfaces 4 which increases the wear resistance and corrosion resistance can be made up of one or more layers.

The key idea of the disclosure in the embodiment depicted is, as indicated above, the use of a wear protection layer consisting of tungsten carbide WC, tungsten-chromium carbide (W, Cr)$_2$C and nickel-chromium NiCr on cast iron brake disks. (W, Cr)$_2$C is the tungsten dicarbide W$_2$C which is known per se, into which various amounts of chromium have been incorporated. This mixed carbide is therefore referred to as $(W, Cr)_2C$. This phase has excellent oxidation resistance and good wear resistance even at high temperatures up to 800° C. In addition, the high-temperature strength and high-temperature oxidation resistance of nickel are increased significantly by alloying with chromium. In the coating, WC is uniformly distributed in the matrix phase composed of $(W, Cr)_2C$ and NiCr. Above a brake temperature of about 600° C., a very thin impermeable oxide layer which can comprise $NiWO_4$, $CrWO_4$, $Cr_2O_3$ or $WO_3$ will be formed on the layer surface. The further oxidation process of the wear protection layer is considerably slowed by the formation of this oxide layer, which significantly avoids oxidation and loss of function of the coating at high temperatures.

Figure 2:
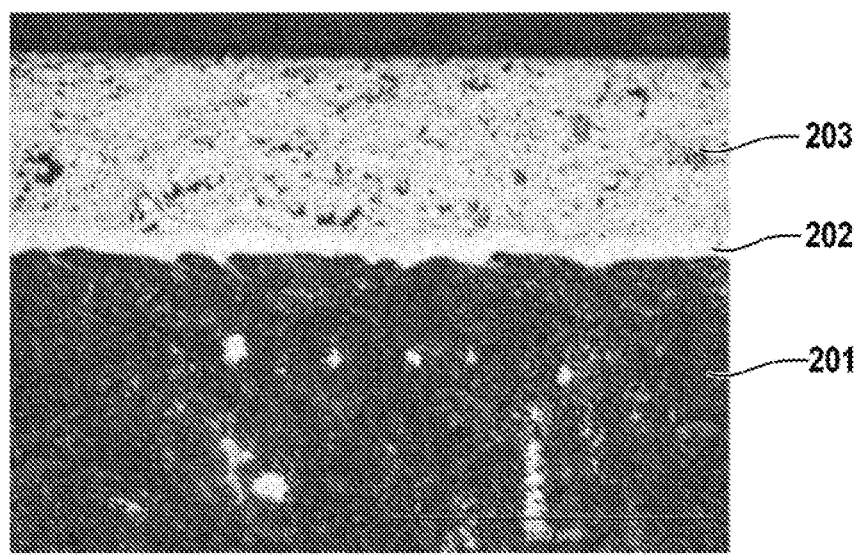
FIG. 2 shows a polished cross section of a brake disk which has been coated according to the disclosure after a severe braking event.

FIG. 2 shows the polished cross section of a cast iron brake disk coated with WC—$(W, Cr)_2C$—NiCr after a brake fading test above 800° C.

The reference numeral 201 denotes the cast iron main element (etched, with phase transformation), the reference numeral 202 denotes an intermediate nickel layer and 203 denotes the WC—$(W, Cr)_2C$—NiCr layer.

Figure 2A:
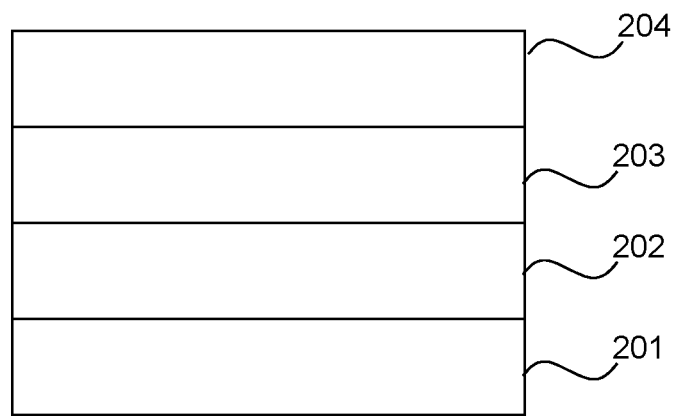
FIG. 2a shows a schematic cross section of the brake disk of FIG. 2.
Figure 3:
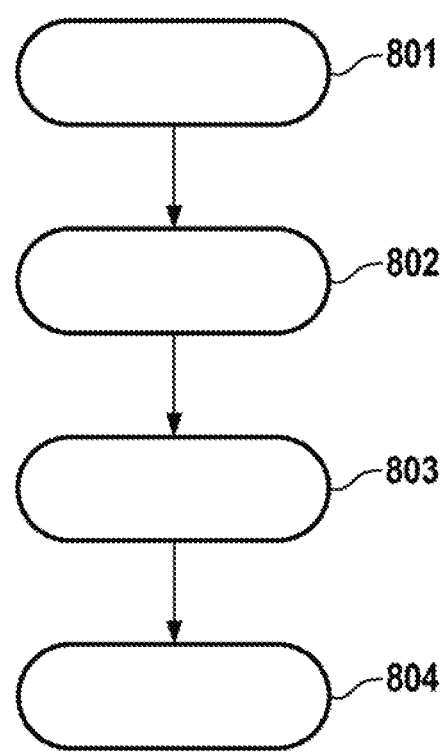
FIG. 3 shows the production process of the disclosure.

The depicted oxide layer on the surface of the wear protection layer 203 is so thin that it cannot be observed at all in the polished section of FIG. 2, but is shown schematically as oxide layer 204 in FIG. 2a. After the fading test, the surface of the wear protection layer 203 is still smooth and the layer thickness is virtually the same as in the new state, which means that the layer has suffered virtually no wear after the test above 800° C.

One embodiment of the cast iron brake disks coated with WC—$(W, Cr)_2C$—NiCr is direct application of the wear protection layer to the cast iron main element by means of high-velocity flame spraying (HVOF). To ensure good adhesion of the layer to the cast iron main element, the surface of the cast iron main element can be roughened, e.g. by sand blasting, before HVOF coating.

A further embodiment is to apply a metallic intermediate layer as bonding agent to the cast iron main element before HVOF application of the wear protection layer. To this end, preference is given to using nickel or nickel-based alloys as the metallic intermediate layer.

The preferred compositions of the WC—$(W, Cr)_2C$—NiCr wear protection layer are:
- 30-50 percent by weight of WC,
- 20-40 percent by weight of $(W, Cr)_2C$,
- 10-35 percent by weight of NiCr,
- and impurities.

The process for producing the brake disk of the disclosure will now be illustrated with the aid of the figure.

In the (optional) step 801, the main element which in this embodiment is configured as gray cast iron is provided. The friction surface of the main element is subsequently treated as indicated above in step 802.

In the (optional) step 803, the friction surface of the main element is coated with the abovementioned intermediate layer.

In step 804, the coating according to the disclosure is then applied.

The invention claimed is:

1. A brake disk comprising:
   at least one friction surface comprising a main element; and
   at least one coating applied to at least parts of the friction surface, the at least one coating comprising at least tungsten-chromium carbide and nickel-chromium.

2. The brake disk as claimed in claim 1, wherein the at least one coating further comprises tungsten carbide.

3. The brake disk as claimed in claim 2, wherein, in the at least one coating, the tungsten carbide is essentially uniformly dispersed in a matrix phase composed of tungsten-chromium carbide and nickel-chromium.

4. The brake disk as claimed in claim 2, wherein the at least one coating further comprises a surface layer containing oxides.

5. The brake disk as claimed in claim 4, wherein the surface layer contains at least one of nickel-tungsten oxide, chromium-tungsten oxide, chromium oxide, and tungsten oxide.

6. The brake disk as claimed in claim 4, wherein the surface layer on the coating is present only after braking events of particular severity.

7. The brake disk as claimed in claim 1, wherein the at least one coating is directly on the main element.

8. The brake disk as claimed in claim 7, wherein the at least one coating is applied to a modified surface of the main element.

9. The brake disk as claimed in claim 1, wherein an intermediate layer is located between the main element and the at least one coating.

10. The brake disk as claimed in claim 9, wherein the intermediate layer contains nickel and/or is formed by a surface treatment of the main element.

11. The brake disk of claim 1, further comprising:
   an oxide layer formed directly on the at least one coating of at least tungsten-chromium carbide and nickel-chromium by heating the at least one coating of at least tungsten-chromium carbide and nickel-chromium to at least 600° C. without depositing any further material on or in the applied at least one coating of at least tungsten-chromium carbide and nickel-chromium.

12. The brake disc of claim 11, wherein the oxide layer is the outermost layer of the brake disc.

13. The brake disk as claimed in claim 1, wherein the main element is formed of gray cast iron.

14. A process for producing a brake disk comprising at least one friction surface that includes a main element and at least one coating applied to at least parts of the friction surface, the method comprising:
   coating at least part of the friction surface with at least tungsten-chromium carbide and nickel-chromium to form the at least one coating.

15. The process of claim 14, further comprising:
   heating the at least one coating of at least tungsten-chromium carbide and nickel-chromium to at least 600° C. to form, directly on the at least one coating of at least tungsten-chromium carbide and nickel-chromium, an oxide layer without depositing any further material on or in the coated at least one coating of at least tungsten-chromium carbide and nickel-chromium.

16. The method of claim 15, wherein the oxide layer is the outermost layer of the brake disc.

17. The process of claim 16, wherein the formed oxide layer comprises:
   forming an oxide layer including at least one of nickel-tungsten oxide, chromium-tungsten oxide, chromium oxide, and tungsten oxide.

18. The process as claimed in claim 14, wherein the at least one coating further comprises tungsten carbide.

19. The process as claimed in claim 18, wherein, in the at least one coating, the tungsten carbide is essentially uniformly dispersed in a matrix phase composed of tungsten-chromium carbide and nickel-chromium.

20. The process as claimed in claim 14, wherein the main element is formed of gray cast iron.

* * * * *